J. H. AUBLE.
PIPE CUTTING IMPLEMENT.
APPLICATION FILED JULY 3, 1914.
1,183,158.  Patented May 16, 1916.
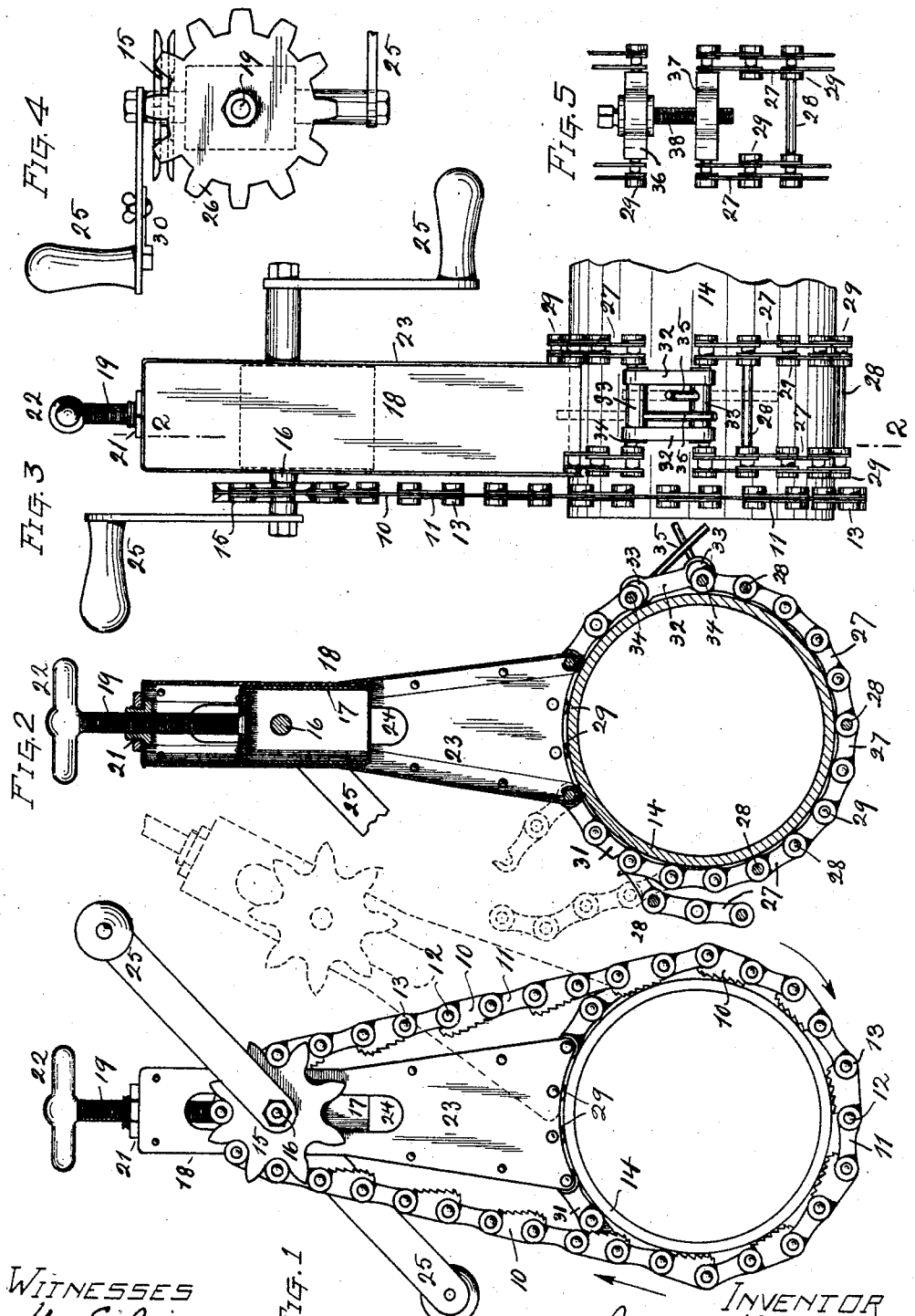
WITNESSES
Geo. E. Bailey
A. Johnson
INVENTOR
James H. Auble
by C. Spengel att.

UNITED STATES PATENT OFFICE.

JAMES H. AUBLE, OF CINCINNATI, OHIO, ASSIGNOR OF ONE-HALF TO CLIFFORD I. SEARS, OF WYOMING, OHIO.

PIPE-CUTTING IMPLEMENT.

1,183,158.      Specification of Letters Patent.      Patented May 16, 1916.

Application filed July 3, 1914. Serial No. 848,891.

*To all whom it may concern:*

Be it known that I, JAMES H. AUBLE, residing at Cincinnati, Hamilton county, State of Ohio, have invented a certain new and useful Pipe-Cutting Implement, of which the following is a clear, full, and exact description, attention being called to the drawing which accompanies this application and forms a part thereof.

This invention concerns an implement for cutting metallic pipe, such as is commonly used for conveying liquid matter, gas, waste water, etc.

It is more particularly designed for use by plumbers for cutting certain kinds of cast-iron pipe, known as "soil" pipe and while being fitted in position.

The invention consists of the construction as hereinafter described and claimed and as illustrated in the accompanying drawing, in which:

Figure 1. is a front-view of the implement. Fig. 2. is a vertical section of the same taken in a plane back of the plane of view of the preceding figure and parallel thereto, the line of section being also indicated at 2—2 in Fig. 3. Fig. 3. is a side-view of the implement. Fig. 4. is a top-view of the same showing a modified feature. Fig. 5. is part of a view similar to Fig. 3, shows another modified feature.

The cutting means consists of blades 10 having a serrated or dentated edge, all assembled by means of link 11 and connected so as to form an endless chain. The connection of these blades and links is as shown, that is to say, each link consists of two members spaced laterally opposite each other with the ends of the blades held between them. The blades are thus caused to follow each other in perfect endwise alinement. The connection of the blades to the links is by pins 12 which pass through the ends of the blades and through the ends of the link members on each side of the blades and rollers 13 are preferably mounted upon these pins on each side outside of the link members.

The implement is positioned as shown in Fig. 1, with the chain cutter encompassing the pipe 14 to be cut and also supported by two spaced pinions 15 whereby it is moved. The chain passes between these pinions while being supported by them by means of its rollers 13 which occupy the spaces between the teeth of the pinions, one pinion engaging the rollers on one side of the chain, and the other pinion engaging those on the other side thereof. The pinions are mounted upon a shaft 16 which is carried in a box 17 slidably fitted into a hollow frame 18 for adjustment.

The frame, as well as box 17, are made of sheet-metal so as to reduce the weight of the implement as much as possible for reasons before alluded to. A screw 19 is provided for the adjustment of box 17, it being seated in a bearing 21 provided for it in the top of the frame. Box 17 is connected to the screw at the lower end thereof and in a manner to move with the same, without interfering with the rotation thereof. A handle 22 serves for manipulation of the screw. The sides of the frame are connected in any suitable manner which may be by rivets and two of these sides, viz 23—23, have slots 24 arranged opposite each other to permit extension of the shaft beyond box 17 for the purpose of attaching operating crank handles 25 thereto and also to clear said shaft when box 17, in which it is mounted, moves while being adjusted by means of handle 22.

Before the implement is positioned as shown in Fig. 1, box 17 is sufficiently lowered by manipulation of handle 22, to ease the cutter chain so as to facilitate the placing of it over the pipe from the end of the same. Obviously this may be accomplished in other ways, as for instance provision may be made to open the chain between two links by the temporary removal of one of the pins, the particular pin being connected by means of a screw connection. Links may be added or removed in a similar manner if necessary to adjust the cutter chain to pipes of various diameters and where the possible range of adjustment by adjustment of box 17 is insufficient for this purpose.

The cutting operation resolves itself simply into rotation of pinions 15, by means of crank-handles 25 whereby the cutter chain is caused to travel over the pipe, the manipulation being so that this travel is in one direction only. Contact of the cutting edges of the blades as they enter the metal is maintained by slowly raising box 17 by means of handle 22, which manipulation constitutes the feed-motion of the cutter-chain. Feed motion may also be had automatically and as shown in Fig. 4 by the provision of projections 26 arranged to form a toothed wheel which is connected to screw 19, the projections extending into the path of a projector 30 adjustably carried on one of the crank arms. This wheel may take the place of handle 22 and may be used for the adjustment necessary for placing the cutter-chain around the pipe. In order that the cut may extend all around the pipe the implement, while being operated for cutting, is also rocked on the pipe from side to side as indicated in dotted lines in Fig. 1, or what would produce the same effect, the pipe may be turned, so that that portion of it is reached which for instance would not be reached if the implement remained in the position shown in Fig. 1. In order to render this part of the manipulation possible, means are required to hold the implement to the pipe so that while the parts are so shifted on each other the cutting blades may not lose their proper position with reference to the cut started. These means consist of a flexible band permanently attached at one of its ends to one of the sides of the frame, its other end being detachably connected to the frame to permit said band to be passed around the pipe. Two chains are used to form this band, one chain being connected to the frame immediately back of the cutter-chain, and the other in a position spaced therefrom and as best shown in Fig. 3. The links 27 of these chains consist each of two opposite parts, spaced laterally from each other and connected by pins 28 with rollers 29 mounted upon the ends of these pins on the outside of the links. This part of the construction may be similar to the construction of the cutter chain and the links may be of the same length. Some of the pins 28 pass through both chains, whereby they are connected to form the aforesaid flexible band and may be manipulated as a unit. This band is passed closely around the pipe and hooks 31 also connected to the frame are used to close it, these hooks being hooked into two of the links at the proper point as conditioned by the diameter of the pipe, the engagement being with pins 28 between the parts of the links. When the implement is rocked as shown in dotted lines and for the purpose above described it rocks on the rollers 29 whereby an easy manipulation is assured. Similar rollers are provided across the lower end of the frame, the pins upon which these particular rollers are mounted being attached to the frame.

A closer fit of the band, after being hooked up, may be obtained by means to take up slack when the engagement of hooks 31 with the links of the chains is not sufficiently close for this purpose. Such a take-up device may consist of intermediate links 32 connected to each other and forming bearings for rockers 33 which, at their ends, have eccentrically positioned pins 34 to which the chain ends connect, these pins with reference to the links of the chains, performing the same function as pins 28. Handles 35 one connected to each rocker serve for manipulation, thus providing adjustment at two places and at each place to various positions. A screw connection as shown in Fig. 5 may also be utilized for closing the holding band or for taking up slack in the same. This screw connection occupies a gap in this band and connects bars 36 and 37 which are supported between the chain ends and by the links adjacent to this gap. A screw 38 is mounted for rotation in one of these bars and received by a screw thread in the other bar. If also used for closing means, hooks 31 would be carried on bar 37.

It will be observed that the cutting blades 10 are tapering, that is at their forward ends having reference to the direction of travel, they are of a width which equals about the diameter of rollers 13. Toward their rear ends their width increases, the increase being between the centers of the rollers at these rear ends and the cutting edges so that said rollers and pins of the joint at the rear ends of the blades travel at a greater distance from the metal to be cut, than those at the front end of the blades. When the cutter chain is in action, the links and blades tend to aline themselves in consequence of the pull, which tendency causes them to hug pipe 14 quite closely and starts the blades to cut into the same while being drawn against it.

The practical effect of the aforesaid arrangement and resultant action is that the cutter blades are gradually started into the metal at the front ends and the entire cutting edge is finally drawn into action by reason of the aforesaid alining pull which persists to a greater degree at the rear ends of the blades by reason of their rearwardly increasing width. It is not necessary when cutting, in cast metal for instance, to continue manipulation until the cut extends entirely through the metal. On the contrary a partial penetration is sufficient in most cases, after which a few taps with a hammer are sufficient to complete the separation. The pipe is sufficiently elevated where the cut is to be made or otherwise placed, so as to be circumferentially free at the point where the implement is to be applied. Crank handles 25 may be positioned so as to be opposite the other sides of the frame, if preferable by reason of the existence of any particular condition like position, location or obstructions. An additional shaft would be provided to serve as a drive shaft and located at right angles below shaft 16 to which it would be operatively connected by any suitable machine elements as for instance by spiral gearing.

Having thus described my invention, I claim as new:

1. In a cutting implement of the kind described, the combination of an endless cutter-chain consisting of links having serrated cutting edges and of intermediate links whereby they are connected to form said chain, a pinion in engagement with this chain, means to rotate this pinion, a frame on which this pinion is mounted and whereby the implement may be positioned for action so that the cutter-chain extends around the object to be cut, and flexible holding means for detachably connecting the implement to the object to be cut and in a manner to permit shifting of it circumferentially thereon.

2. In a cutting implement of the kind described, the combination of an endless chain comprising links having serrated cutting edges, a pinion in engagement with this chain, a frame on which this pinion is mounted and whereby the implement may be positioned so that the chain extends around the object to be cut, means to rotate the pinion to cause the chain to move over this object and means to move the pinion on the frame away from the object to draw the chain against the latter so as to maintain the cutting blades in cutting contact.

3. In a cutting implement of the kind described, the combination of an endless cutter-chain consisting of links having serrated cutting edges and of intermediate links whereby they are connected to form said chain, a frame on which it is supported and whereby the implement is positioned for action and so that the cutter-chain extends around the object to be cut, means to move the chain for cutting, a flexible band connected at one of its ends to the frame mentioned and attaching means for detachably connecting its other end to the frame after said band has been passed around the object to be cut, to hold the implement to said object and in a manner to permit shifting of it circumferentially thereon.

4. In a cutting implement of the kind described, the combination of a series of cutting blades having cutting teeth in one of their edges, links whereby they are connected to form a chain and pins at the joints where contiguous ends of blades and links meet and overlap and whereby they are connected, the cutting blades at their rear-ends being wider than at the other end, this excess being between the cutting edge and the center of the pin which forms part of the connecting joint at the particular end.

In testimony whereof, I hereunto affix my signature in the presence of two witnesses.

JAMES H. AUBLE.

Witnesses:
C. SPENGEL,
A. JOHNSON.

Copies of this patent may be obtained for five cents each, by addressing the "Commissioner of Patents, Washington, D. C."